United States Patent [11] 3,587,361

[72] Inventor Theodore M. Smith
 Detroit, Mich.
[21] Appl. No. 804,604
[22] Filed Mar. 5, 1969
[45] Patented June 28, 1971

[54] NO TOOL DETECTION SYSTEM AND TOOL HOLDER
 7 Claims, 2 Drawing Figs.
[52] U.S. Cl. ............................................. 408/16,
 408/6; 10/129, 90/11, 250/83, 250/106
[51] Int. Cl. ..................................... B23b 47/00,
 B23q 11/00
[50] Field of Search .......................... 77/5.2;
 250/83, 106, 108; 90/11; 10/128, 129

[56] References Cited
 UNITED STATES PATENTS
3,381,550 5/1968 Smith ........................... 77/5

Primary Examiner—Francis S. Husar
Attorney—Cullen, Sloman and Cantor

ABSTRACT: A "no tool," "broken tool" or "improperly set tool" detection device for use with taps, drills, reamers, boring tools, counter bores and milling cutters which includes a tool holder and a movable shell thereon normally biased outwardly of each other, with a radioactive element on the holder and the shell normally spaced from the radioactive element, in conjunction with a radiation detection system whereby upon compressive engagement of the tool with a work piece due to its longitudinal feed, there will be a relative movement of the tool holder and shell such as will position said shell to protectively enclose said radiation element, said relative movement being prevented when there is "no tool," "a broken tool" or an "improperly set tool"; and the method of providing said detection system.

PATENTED JUN 28 1971

3,587,361

INVENTOR
THEODORE M. SMITH

BY Cullen, Sloman, & Cantor

ATTORNEYS

NO TOOL DETECTION SYSTEM AND TOOL HOLDER

BACKGROUND OF THE INVENTION

In applicant's earlier issued U.S. Pat. No. 3,381,550 dated May 7, 1968, entitled, "Apparatus For A Tool Failure Detection System," there was provided a compensating type of tool holder including a pair of relatively moveable parts. In that construction, a radioactive element was mounted upon one of the relatively movable parts, and a shielding device normally covering the radioactive element was mounted upon the other part. A failure of contemplated function of the tool in the machine tool was adapted to cause a relative movement between the parts such as would uncover the radioactive element to activate a radiation detection system for avoiding damage to a workpiece, to give an audible or visible signal. It was designed to prevent damage to workpieces on a production line which might not otherwise be discovered until after a complete machining operation with consequent loss and expense.

In accordance with the present invention, the same principle may be employed in a device to detect the presence automatically of "no tool," "a broken tool" or an "improperly set tool" for taps, drills, reamers, boring tools, counter bores and milling cutters and give an instantaneous signal by which the machine tool or production line may be shut down until a proper tool is provided.

It is an object of the present invention to provide an improved tool holder whereby upon the existence of either "no tool," "a broken tool" or an "improperly set tool" after a predetermined feed movement of the tool holder and a shell such as would normally be caused by engagement of a properly set tool with respect to the workpiece to activate a radiation detection system and for automatically shutting down the equipment.

It is a further object to incorporate in the present system and in conjunction with such tool holder, an electrical circuit which includes a radiation detection system which circuit is normally closed and incorporating a limit switch or the like which is mechanically or electrically opened upon such normal feed movement of the tool holder which with a normal tool properly set would otherwise compressively engage the workpiece so that relative movement of the workpiece holder parts would cause a shielding of the radioactive element.

The detail of construction for the mounting and protectively enclosing of a radioactive ring upon a tool holder is set forth in applicant's copending U.S. Pat. application, Ser. No. 489,522 filed Sept. 23, 1965.

It is another object to provide an improved tool holder which mounts a radioactive element in a very simple construction which includes a shell mounted over the tool holder and normally biased so as to expose the radioactive element and which upon contact of a tool within the tool holder with a workpiece with the tool properly set will cause such relative movement of the shell with respect to the tool holder as to protectively enclose the radioactive element.

These and other objects will be seen from the following specification and claims in conjunction with the appended drawing in which:

DETAILED DESCRIPTION

Figure 1:
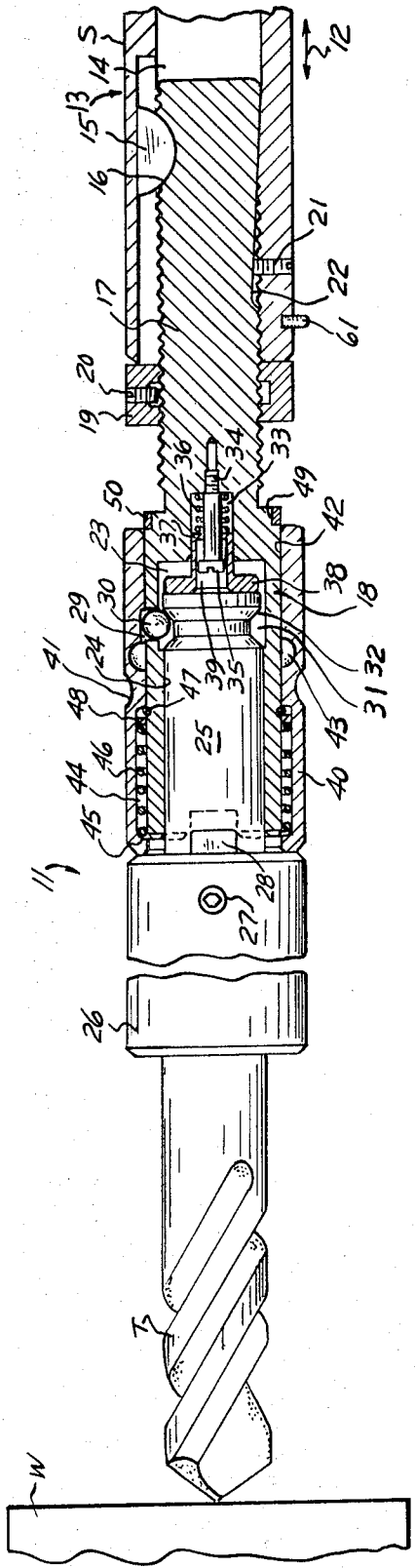
FIG. 1 is a longitudinal section of the present tool holder detection device with the power and feed spindle and workpiece fragmentarily shown.

The present "no tool," "broken tool" or "improperly set tool" detection device is generally indicated at 11, FIG. 1 mounting a cutting tool T such as may be used with taps, drills, reamers, boring tools, counterbores, milling cutters and the like.

The cutting tool T is shown spaced from the workpiece W, fragmentarily shown, said tool holder being mounted within a conventional type work driving and feeding spindle S, the arrow 12 indicating conventional type of reciprocal feed movement which may be employed and the numeral 13 designating the direction of rotation of said spindle.

Said spindle has a bore 14 and projected there into the radial key 15 which registers with a corresponding key-way 16 within the shank 17 of tool holder 18.

Adjusting nut 19 is mounted over said shank and secured in desired position by set screw 20.

Secondary set screw 21 projects radially inward through said spindle and engages the tapered portion 22 of said shank as one means of effectively locking the tool holder shank within said spindle for rotative drive as desired.

The tool holder adjacent one end has a bore 23 terminating in a counterbore 24 of slightly smaller diameter adapted to cooperatively receive the shank 25 of the cutting tool adapter 26.

Said adapter is of a generally conventional construction includes the transverse locking screw 27 and the drive key 28 and is removably inserted within the tool holder with the shank 25 projected snugly into the bore 24 and loosely into the bore 23 as shown in FIG. 1.

A series of transverse ball receiving bores 29 are formed through the wall of said holder and communicate with bore 23 and are adapted to movably nest the shank retaining balls 30 whose inward adjustment for anchoring the shank is limited to the positioning shown in FIG. 1.

The shank has an annular locking groove 31 whose outer walls are tapered outwardly and are in retained registry with the respective balls 30, of which there are three in the illustrative embodiment.

One of the tapered surfaces corresponding to said groove 31 is in the nature of a cam 32 adapted to disengage the balls from the recess 31 to permit withdrawal of the shank 25 and adapter 26 when the surrounding shell 40 has been moved longitudinally so that its internal annular recess 43 is in registry with the balls as hereafter described.

The tool holder at the end of bore 23 has a counterbore 33 terminating in an axial threaded aperture into which is projected the threaded end of bolt 34. Said bolt extends axially outward within counterbore 33 and terminates in the enlarged head 35. Coiled compression spring 36 surrounds bolt 34 and bears against a portion of the tool holder at the base of counterbore 33.

The other end of spring 36 bears against the inturned stop flange 37 of the pressure pad 38 with the headed portion of the bolt 34 extending up into the bore 39 of said pressure pad.

In the assembled position of the adapter shank 25 within the tool holder, the inner end of said shank is compressively engaged by the pressure pad 38 which is normally biased outwardly by the spring 36 thereby placing tension at all times upon said shank; said coil spring being in compression with the adapter inserted as shown in FIG. 1.

Mounted over and surrounding the outer portion of the tool holder is a shell 40 which has an annular groove 41 providing a grip to facilitate retraction of said shell manually.

Said shell includes the bore 42 which snugly and slidably receives tool holder 18 and formed within said bore is the annular counterbore or ring groove 43 by which with the shell retracted and in registry with the balls 30, outward manual forces applied to the shank 25 will cam the balls into the recess 43 and permit withdrawal of the tool adapter 26 and its shank 25 from the tool holder.

The interior surfaced of the shell has an elongated additional counterbore 44 which defines the shoulder 45 at the forward end thereof as shown in the drawing.

The compression spring 46 is nested within the bore 44 and engages the shoulder 45 at one end and at its opposite end, engages the washer 48 anchored by the snap ring 47 mounted upon the tool holder.

The shell intermediate its ends has an internal shoulder corresponding to the inner end of the bore 44 by which upon engagement with the ring 47 limits relative outward movement of said shell to the position shown in FIG. 1. A central portion of the tool holder normally outward of said shell has an annular groove 49 within which is nested and fixedly secured enclosed radioactive ring 50.

In normal operation with a properly set tool T mounted by the adapter 26 operative engagement of the tool with the workpiece W due to a feed movement of the spindle S will cause a relative movement of the tool holder with respect to said shell so that the shell will normally enclose protectively said radioactive ring 50 and prevent the escape or emission of radioactive rays such as would otherwise activate a radiation detection system.

The radioactive ring 50 is impregnated with a radioactive substance and in the normal position of the parts of the tool holder with the tool T out of contact with the workpiece is exposed due to the relative positioning of the shell 40.

Figure 2:
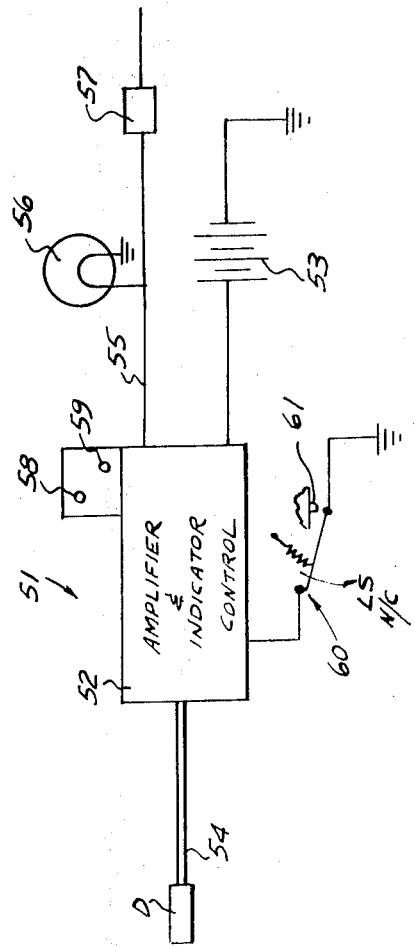
FIG. 2 is a schematic diagram of the electrical circuit of the radiation detection system.

The rays normally emitted from the radioactive element or ring 50 are adapted to activate a radiation detector such as shown schematically in FIG. 2.

The present detection system 51 includes a detector D of the Geiger tube type which is adapted to sense radioactive rays when emitted from element 50 on the tool holder under certain conditions.

In the circuit shown in FIG. 2, an electrical amplifier and indicator control 52 is biased by normally closed limit switch 60 to ground.

The amplifier and indicator control assembly 52 is connected to detector D by the lead wires 54, and also to power source 53.

The radiation detection system includes "off" and "on" switch 58, reset button 59 and the lead 55 to the signal device 56 which may be a bulb or light or an audible signal.

In the same circuit in series therewith there is schematically shown a control element 57, which when energized, may be adapted to either shut down the machine tool or to effect a withdrawal with the tool holder spindle to an inoperative position.

The present Geiger tube type of detector senses the exposure of the radioactive element 50 whenever there is a failure of relative longitudinal movement between the tool holder and the shell 40 which is shown in FIG. 1 and bears against tool holder adapter 26.

The increase in detector count rays causes the electronic circuitry to deflect a meter relay in the detection system generally indicated at 52 which may include, as shown in FIG. 2 schematically, an amplifier and an indicator control in an electrical circuit which forms no part of the present invention, for activation of an alarm relay assembly in turn, energizing the alarm light 56 or other signal or the control mechanism 57. This illustrates one circuit by which the present detection system functions.

Electronic parts such as generally designated at 51 with the type of circuitry shown in FIG. 2 are sold by Eberline Instrument Company and others. The circuitry and construction of the detection system forms no part of the present invention but merely illustrative of one such detection system with which the present tool holder may be adapted.

In the illustrative embodiment, the sealed source of radioactive radiation material 50 should be such that one-fourth inch, for illustration, of the shell 40 will give an alternation of approximately 1,000.

There is, thus, employed in connection with the radioactive element 50, beta radiation or low energy gamma radiation. Sources of these may be as follows:

Strontium-90
Cerium-144
Krypton-185
Thallium-204
Radium-D
Radium-E

This is by way of illustration only and not limitations, since it is contemplated that other nuclides may be suitable for this purpose in the low energy range.

The present tool holder device provides for the use of radioactive isotopes in the form of the radioactive element or ring 50 applied to a tool holder and wherein upon the existence of "no tool," "a broken tool" or an "improperly set tool," the normal relative movement of the tool holder with respect to the shell which would otherwise cause shielding of the radioactive element is prevented, with the result that the emitted rays from the radiating element are available to activate the radiation detection system 51, provided the same has been energized.

In the present construction, as the tool holder is activated by the spindle S and before contact normally of the tool T with the workpiece W, the radioactive element 50 is unshielded, FIG. 1.

During this period, however, a circuit which includes the radiation detector is open, noting the limit switch 60 which is normally closed. It is only after such longitudinal feed of the spindle S as would normally place a properly set tool T in engagement with the workpiece W, that such feed movement causes the stop 61 as mounted upon the spindle and shown schematically in FIG. 2 to mechanically open limit switch 60; thus, activating the radiation detection circuit.

At that time, however, if the workpiece W has been properly engaged by the tool T, there will be a compressive movement of the tool holder 18 with respect to the shell 40 with the result that the tool holder and the radioactive element 50 mounted thereon will move so as to be shielded by said shell. Such movement can be for a distance equal to the space between the adapter 26 and the outer end of the holder shown in FIG. 1 at which time the radioactive element 50 would be completely shielded by the shell.

Thus, under those conditions, the signal mechanism 56—57 would not be activated. This is the normal situation.

On the other hand, if there is "no tool" present, as can happen, or a "broken tool" or an "improperly set tool," then the above mentioned inward feed movement of the spindle will not cause the above described relative movement between the holder and the shell with the result that the radioactive element 50 will remain exposed and at the proper time, activate the detection system.

At the end of the boring or tapping operation, the tool holder 18 is withdrawn by the spindle. Just as soon as the contact 61 moves away from limit switch 60, the electronic circuit to the radiation detection device is closed or grounded and inhibits the detection system.

It is noted, furthermore, that with the presence of a proper tool T, properly set, inward feed movement of the spindle and the connected tool T with respect to the workpiece W will cause a compression of the coil springs 46 and 36.

Accordingly, when the holder retracts and is withdrawn, so that the tool is out of contact with the workpiece W, the springs 46 and 36 function in their expansion so as to cause a relative outward movement of the shell 40 with respect to the tool holder such that the said shell is moved so as to no longer enclose the radioactive element as shown in FIG. 1.

At the same time, such withdrawal movement of the spindle has closed the limit switch 60 so that the radiation detection system is inoperative.

The present improved tool holder is a simplified construction in that it incorporates essentially, only the movable shell 40 which may be manually retracted using the grip 41, to permit disengagement of the balls 30 which are cammed outwardly by the cam surface 32 on the shank 25; said balls being adapted to move into the annular groove 43, then in registry with the manually retracted shell.

As soon as manual pressure is removed from said shell, shell will move relatively to the tool holder to the position shown in FIG. 1, the adapter 26 and its shank having already been removed.

It follows conversely that the shank 25 may not be inserted within the tool holder until the shell has also been manually retracted again to provide a place for the balls to go during insertion of said shank until the locking groove 31 of said shank is in registry with said balls.

Thus the compression spring 46 serves the additional purpose of providing a control for the insertion and removal of the tool adapter 26 and its shank.

It is seen, furthermore, that under normal operating conditions with the tool T engaging the workpiece, both of the springs 46 and 36 are under compression and the tool holder 18 has been moved inwardly so that the shell enclosed the radioactive element.

The springs, therefore, serve the additional cocking function so that as soon as the spindle and tool are retracted at the end of a cutting operation, the parts will automatically reassume the position shown in FIG. 1.

Having described my invention, reference should now be had to the following claims.

I claim:

1. In a "no tool," "broken tool," or "improperly set tool" detection device for taps, drills, reamers, boring tools, counter bores and milling cutters;

an elongated tool holder having a bore at one end and a shank at its other end adapted for connection to a source of rotative power and longitudinal reciprocal feed;

a radioactive impregnated element mounted upon said holder;

a cylindrical shell movably mounted over said holder;

spring means interposed in compression between said holder and shell normally maintaining said shell spaced from and exposing said radioactive element;

an adapter mounting a tool for operative engagement with a workpiece, and a shank on the adapter projected into the tool holder bore and interlocked therewith;

said adapter engaging said shell and spaced from said holder;

means mounting the adapter shank for operative driven engagement with said holder and for longitudinal movement of the holder relative to said shell on engagement of said tool with said workpiece;

said relative movement causing said shell to cover and enclose said radioactive element;

the rays from said radioactive element adapted to energize a radiation detection system upon failure of relative longitudinal movement due to the existence of "no tool," "a broken tool," or "an improperly set tool";

retraction of said longitudinal feed and disengagement of said tool and workpiece permitting relative movement of said tool holder and shell in the opposite direction for spacing the shell from said radioactive element.

2. In the detection device of claim 1, an electrical circuit including said radiation detection system;

and a normally closed switch in the circuit mechanically opened upon such longitudinal feed movement of said tool holder as would bring a properly set tool into contact with said workpiece.

3. In the detection device of claim 1, a pressure pad axially mounted adjacent and yieldably spaced from the inner end of said tool holder bore;

and spring means biasing said pad outwardly;

said adapter shank on assembly into said bore operatively engaging said pressure pad placing said adapter shank under tension, said pressure pad normally urging said adapter shank outwardly of said tool holder.

4. In the detection device of claim 1, there being a plurality of spaced transverse bores extending through said tool holder into its bore;

said adapter shank having an annular locking groove;

a ball in each of said transverse bores movably projecting into said groove locking said adapter shank;

said shell normally retaining said balls in locking position;

said shell having an interior annular recess normally displaced from said balls;

and, on retraction of said shell relative to said tool holder positioning said recess to receive said balls, permitting withdrawal of said adapter shank from said tool holder.

5. In the detection device of claim 1, said radioactive element being selected from the group consisting of beta radiation and low energy gamma radiation.

6. In the detection device of claim 1, the radioactive element being selected from the group consisting of Strontium-90, Cerium-144, Krypton-185, Thallim-204, Radium-D and Radium-E.

7. In the detection device of claim 1, said radioactive elements being in the form of a ring mounted on said tool holder, said shell in the form of a sleeve upon said relative movement adapted to protectively enclose said ring.